April 21, 1936.    H. S. KONHEIM ET AL    2,038,432
VISCOSITY MEASURING DEVICE
Filed May 10, 1932
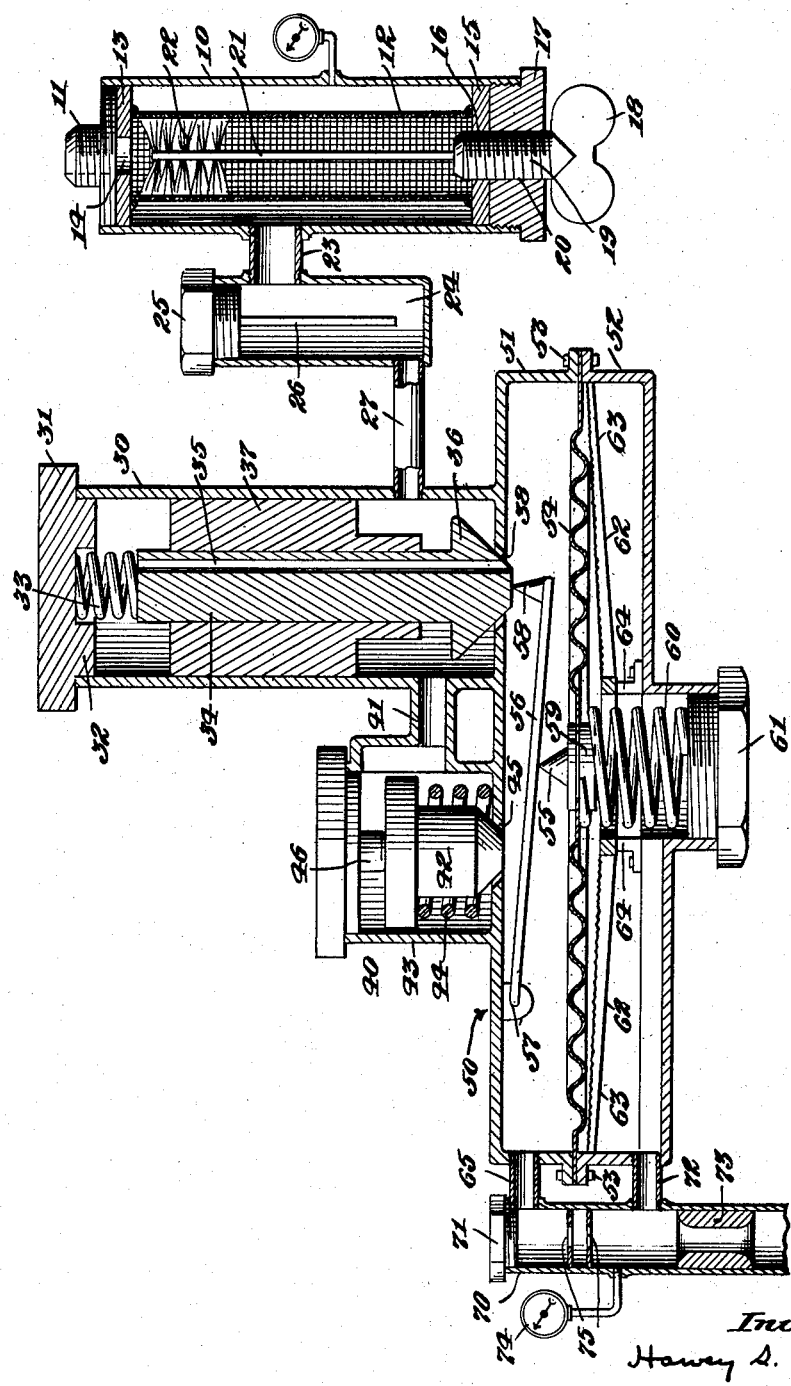
Inventors
Harvey S. Konheim
Walter J. Alberheim
By Carl M. Cohen
Atty.

Patented Apr. 21, 1936

2,038,432

UNITED STATES PATENT OFFICE 2,038,432

VISCOSITY MEASURING DEVICE

Harvey S. Konheim, Lynbrook, and Walter J. Albersheim, New York, N. Y.

Application May 10, 1932, Serial No. 610,466

9 Claims. (Cl. 265—11)

This invention relates to a continuous reading viscosity meter for use in connection with internal combustion engines, Diesel engines, fuel oil systems, and many other uses where it is desirable to measure and/or control the viscosity of a liquid.

It is an object of this invention to provide a viscosity meter with a sludge removing arrangement which is particularly adapted for frequent cleaning, with a minimum of effort and removal of parts of the meter.

It is a further object of this invention to provide a viscosity meter with a device for determining the presence of certain constituents in the oil, such as, for example, free acid, or free and combined sulfur.

Further, it is an object of this invention to provide a viscosity meter with an automatically operated valve which is more accurate in its operation.

And it is a further object of this invention to provide a continuous reading viscosity meter which will give accurate readings when operating in a system where the pressure of the circulating liquid falls to a value below that at which devices of this kind heretofore produced have been able to function.

These and many ancillary objects of the invention will be readily apparent to those skilled in the art from the following description taken in connection with the accompanying drawing in which:

The figure is a cross-sectional elevation of a device embodying the principles of the present invention.

Referring in detail to the drawing, the meter is provided with a cylindrical casing 10 to which is connected an inlet pipe 11 to permit the entrance of the liquid. Mounted internally of the cylinder 10 is a screen 12 of copper wire or gauze or any other suitable material having any desired mesh. The disc 13 is soldered or otherwise joined to the screen 12, and is provided with a central opening 14 which registers with the opening of the pipe 11. The disc 13 is dimensioned to prevent the liquid from flowing downwardly in the cylinder except through the opening 14 and into the interior of the screen 12. The bottom of the screen is provided with a second disc 15 which is also in water tight relationship with the interior of the cylinder. A hole 16 is provided in the disc 15 as will be more fully described below. The nut 17 screwed into the bottom of the casing 10 serves as a support for the disc 15 and holds the screen within the cylinder. A wing nut 18 having a threaded shank 19 threaded through an opening 16 in the disc 15 and also through the hole 20 of the nut 17. The threads on the shank 19 mesh with the threads provided internally of the disc 15 and the nut 17, thus sealing the bottom of the cylinder to the liquid. Joined to the shank 19 is a stem 21 at the upper extremity of which is a brush 22 of wire or hair bristles of sufficient length to engage the inner walls of the screen, whereby to clean the same of any adhering particles of sediment or sludge, when the nut is unscrewed and drawn outwardly through the bottom of the cylinder.

Connected to the cylinder 10 by means of the pipe 23 is a well 24, having a screw cap 25 to which is attached a strip 26 of some suitable indicator metal such as copper or zinc, for example. It will be understood, of course, that this strip is replaceable.

A pipe 27 connects to the balanced valve casing 30, having a removable cap 31 provided with a circular rim 32 into which is fitted a coil spring 33. A vertically slidable plunger 34 having an internal bore 35 and a head 36 rides in a bushing 37 mounted within the casing 30, and is normally urged downwardly against the valve port 38 by the spring 33. A cut off valve 40 is connected to the casing 30 by pipe 41. This valve comprises a valve stem 42 which is slidable within the casing 43, and which is normally urged upwardly out of engagement with the valve port 45 by a coil spring 44. A stop 46 limits the upward movement of the stem 42.

The main casing 50 is formed in two flange sections 51 and 52 which are bolted together by bolts 53. A yieldable diaphragm 54 is held between the flanges dividing the casing into a lower chamber and an upper chamber. Carried by the diaphragm 54 is a conical lug 55 which engages a link 56, which is pivoted to the casing at 57. A second conical point 58 is carried by the link 56, and engages the plunger 34 through the port 38. An abutment 59 is carried by the diaphragm 54 and the former is engaged by the top of a coil spring 60 which is supported on a cap screw 61 in the lower section 52. The compression of the spring 60 may be regulated by adjusting the screw cap 61. A conical spider 62 having arms 63 supported by standards 64 is attached to the bottom of the section 52. The top surfaces of the arms 63 are serrated or otherwise grooved to preclude the diaphragm 54 from clinging to the spider when it is distended downwardly.

Connected with the main casing 50 by the conduit 65 is a secondary casing 70 having a screw cap closure 71 at its top. Below the point where the conduit 65 leads into the casing 70 are mounted two or more sharp edged orifices 75 in parallel as shown. The two orifices in series are used to permit accurate viscosity readings over a wide range without a very substantial variation in the quantity of liquid passing through the meter.

The following is an explanation of the theory of multiple orifices connected in series:

The action of the viscosimeter is based upon the principle of obtaining a constant quantity of flow through the device. This is achieved by maintaining a constant pressure drop through the orifice or orifices. The underlying theory is that the pressure drop through a sharp-edged orifice is very nearly proportional to the square root of the flow, and nearly independent of viscosity. If we call D the density of the liquid (which is close to unity); A the cross-sectional area of the orifice; P the pressure drop across the orifice; and Q the quantity of flow, then we have the well-known equation $$P = \frac{Q^2}{2DA^2}.$$

If we call the dynamic flow resistance $$R = \frac{P}{Q},$$

then it is seen that R is inversely proportional to the square of the orifice area.

However, any orifice, no matter how carefully designed, has a small component of frictional resistance. According to Poiseuille's law, the pressure drop across a friction tube equals $$79 \frac{LQV}{A^3}.$$

In this equation L signifies the length of the friction tube and V the viscosity of the liquid. From the above equation it is seen that the flow resistance R, equal to $$\frac{P}{Q},$$

is inversely proportional to the cube of the area. Under normal conditions the viscosity resistance is negligible as compared to the dynamic resistance for a short orifice. If, however, we attempt to increase the dynamic resistance by reducing the area, the viscous resistance increases more rapidly than the dynamic resistance and we finally reach a point where it cannot be neglected any longer as it disturbs the calibration of our instrument for very viscous liquids.

If, for instance, we cut the area of the orifice in half in order to obtain four times the dynamic resistance, the viscous resistance is increased eight fold, and thereby the ratio of viscous to dynamic resistance is doubled. If, on the other hand, we maintain the previous orifice area and increase the resistance four-fold by connecting four equal orifices in series, then the viscous resistance is also increased four-fold and the ratio of viscous to dynamic resistance remains the same.

This theory has been borne out by experiment, and its application has enabled us to extend the measuring range of our instruments. Below the orifices is a pipe 72 connecting this portion of the casing 70 with the interior of the lower section 52 of the main casing 50. Following the pipe 72 is a friction tube or restricted passage 73 which is connected to the oil reservoir or oil sump. A gage 74 is connected between the orifices and the friction tube.

The operation of the instrument will now be described:

The liquid to be tested is admitted through the inlet 11, passes through the opening 14 into the inside of the screen, thence out through the meshes of the screen through the pipe 23 into the well 24. In passing through the screen 12 the oil is filtered, the solid particles carried by the oil are deposited upon the inner walls of the screen, and some fall to the bottom. At frequent intervals it becomes necessary to clean the screen, and to this end the wing nut 18 is unscrewed permitting the brush 22 to be manipulated to brush off the screen and remove the dirt.

The liquid is now flowing through the well 24 which contains the strip 26 of copper or zinc for example. At frequent intervals the cap 25 may be removed and the strip examined. The extent of its corrosion indicates the acidity of the liquid. Obviously, other chemical properties may be indicated by inserting the proper indicating material in the well.

From the well the liquid flows into the valve casing and through the valve ports 38 and 45 into the upper section of the main casing. The spring 44 is so adjusted that the valve 42 closes when a certain predetermined pressure in the supply line is obtained; and opens when this pressure falls to a certain value. This valve serves as an auxiliary to insure a sufficient supply of liquid to the instrument, especially where accurate readings are essential under relatively low pressure conditions in the supply line. When the valve 42 is closed, this part of the apparatus plays no part in the operation of the instrument.

We shall now describe the main valve's operation especially its balanced feature. The liquid enters the valve casing and builds up a pressure between the bushing 37 and valve head 36. This pressure tends to close the valve port 38 by depressing the head 36. Now, there is a certain pressure in the section 51 which acts over an area equal to the area of the port 38 tending to force the valve head 36 upwardly. It is this last mentioned hydraulic force which we desire to balance out. This effect is accomplished by leading the liquid under the pressure in the section 51 back through the small passage 35 into the portion of the casing above the valve stem 34. This stem is dimensioned to provide an area equal to that of the port 38 and the liquid acting upon this area provides a hydrostatic pressure equal and opposite to the one acting upwardly against the head 38, thereby giving us a balanced valve.

We have found that in order to provide a sensitive and accurate meter for use over a wide range of pressures of the liquid it is necessary to multiply the movement of the yieldable diaphragm before applying it to the valve stem. The movement of the diaphragm is multiplied by the pivoted link 56, the increase in motion being in proportion to the ratio of the distance between 55 and 57 to the distance between 55 and 56.

The movement of the diaphragm 54 causes the valve head 36 to seat and unseat, thereby controlling the flow of liquid into the upper chamber of the meter. From here the liquid passes thru 65 into the casing 70, where it passes thru the orifices 75, thru 72 and into the lower chamber of the casing 50. Liquid flows out of this chamber and out of 70 thru the frictional obstruction 73. The gauge 74 measures pressure variations corresponding to changes in viscosity of the liquid. In other words, the structure including the diaphragm 54, valve 34, and orifices 75

75 function to control the flow of liquid to the friction tube 73 and the resistance to flow thru the latter is a direct function of the viscosity. For a more detailed discussion of the theory of operation see our Patent No. 1,958,878 of May 15, 1934.

Having thus described our invention we claim:

1. In a continuous reading viscosity meter having a valve to control the flow of a liquid into said meter, an auxiliary valve having a cut off at a predetermined pressure, whereby an additional inlet for the liquid is provided when the pressure thereof falls to a predetermined value.

2. In a continuous reading viscosity meter having a valve to control the flow of liquid into said meter, and a valve provided with a spring constructed and arranged to hold the valve open as long as the pressure of the liquid conducted to the meter remains below a predetermined value.

3. A viscosity meter comprising in combination a casing, a yieldable diaphragm dividing said casing into an upper section and a lower section, said upper section being provided with an opening, a valve stem having a top and a bottom face for controlling the flow of liquid through said opening, the pressure of the liquid in said upper section acting upon the bottom face of said stem in one direction, an inlet connected to conduct the liquid to said opening, and a conduit for conducting liquid from said upper section to said top face, whereby it acts to exert pressure upon said stem in a direction opposite to said first mentioned direction, and a connection between said diaphragm and said valve.

4. A continuous reading viscosity meter comprising in combination, a balanced valve to control the flow of liquid, an auxiliary valve to control the flow of liquid, a casing having a yieldable member dividing the same into an upper and a lower section, means connected to said member for controlling said balanced valve, there being a passage to permit the flow of liquid from said upper section into said lower section, said lower section having a restricted passage connected thereto, and means to indicate the pressure of the liquid entering said restricted passage.

5. A continuous reading viscosity meter comprising in combination a first casing, a yieldable member mounted therein dividing the same into an upper and lower section, a second casing having an orifice and a friction tube mounted therein, means connecting from the said upper section to one side of said orifice, means connecting from between the other side of said orifice and said tube to said lower section, and means to indicate the pressure between said orifice and said tube, and a valve to control the flow of liquid into said first casing.

6. A continuous reading viscosity meter comprising in combination a first casing, a yieldable member mounted therein dividing the same into an upper and lower section, a second casing having an orifice and a friction tube mounted therein, means connecting from the said upper section to one side of said orifice, means connecting from between the other side of said orifice and said tube to said lower section, and means to indicate the pressure between said orifice and said tube, and a valve operable by said member to control the flow of liquid into said first casing.

7. A viscosity meter comprising in combination a casing having a yieldable member dividing the same into an upper and lower section, a second casing having an orifice mounted therein, opposite sides of said orifice being connected to opposite sides of said member, said member being moveable in accordance with pressure changes upon opposite sides thereof, a valve having a stem moveable to control the flow of liquid into said casing, a pivoted link actuating said stem, and means carried by said yieldable member and contacting with said link for moving the same, whereby the movement imparted to said stem is greater than the movement of said yieldable member.

8. A viscosity meter comprising in combination a casing having a yieldable member dividing the same into an upper and lower section, a second casing having an orifice mounted therein, opposite sides of said orifice being connected to opposite sides of said member, said member being moveable in accordance with pressure changes upon opposite sides thereof, a valve having a stem moveable to control the flow of liquid into said casing and means connecting between said member and said stem for multiplying the movement of said member and imparting it to said stem.

9. A viscosity meter comprising in combination a casing having a yieldable member dividing the same into an upper and lower section, a second casing having an orifice mounted therein, opposite sides of said orifice being connected to opposite sides of said member, said member being moveable in accordance with pressure changes upon opposite sides thereof, means having a corrugated surface to limit the movement of said member, a valve having a stem moveable to control the flow of liquid into said casing, a pivoted link actuating said stem, and means carried by said yieldable member and contacting with said link for moving the same, whereby the movement imparted to said stem is greater than the movement of said yieldable member.

HARVEY S. KONHEIM.
WALTER J. ALBERSHEIM.